Figure 1:
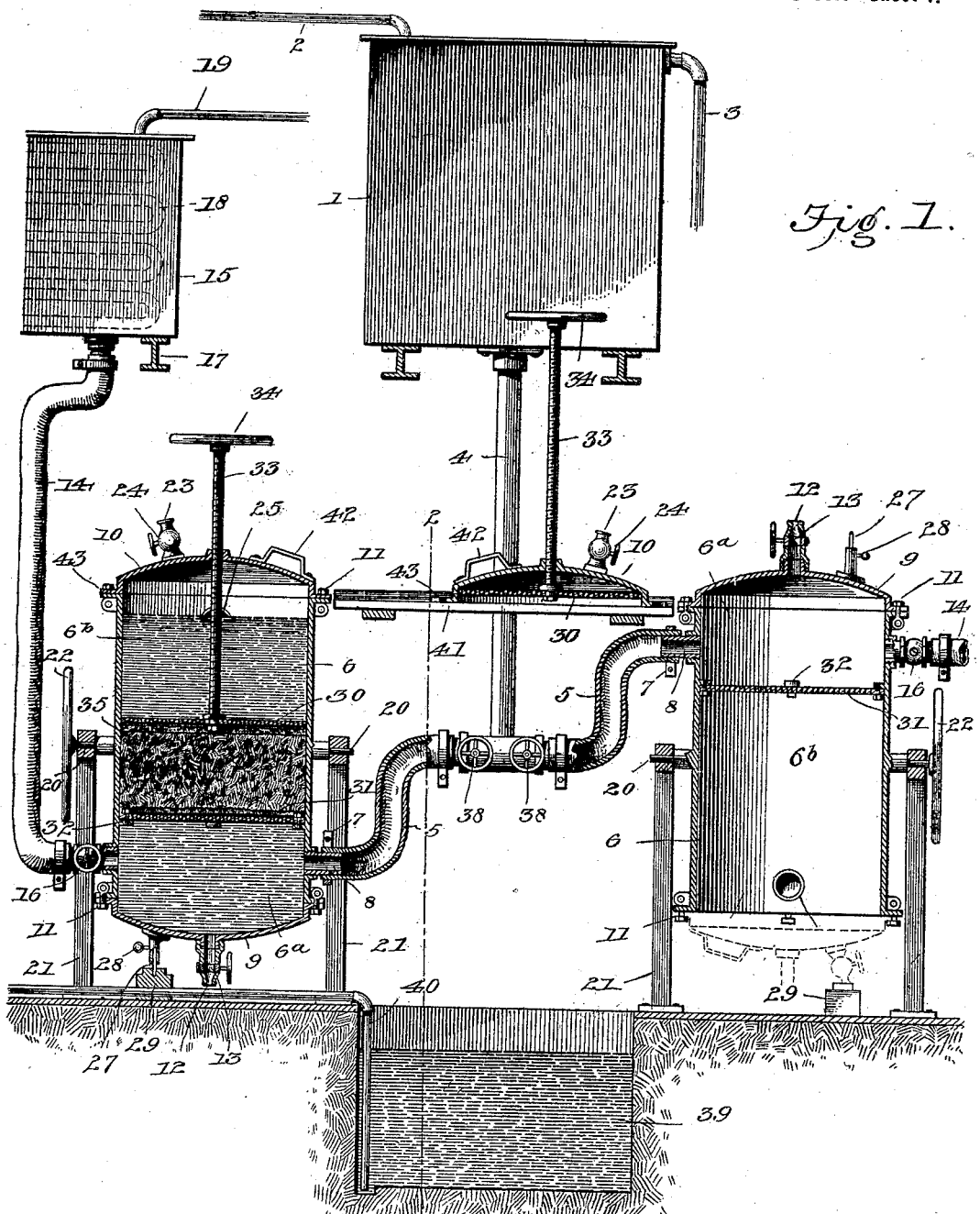

No. 622,614. Patented Apr. 4, 1899.
J. W. FLEETWOOD.
FILTER.
(Application filed Mar. 25, 1898.)
(No Model.) 2 Sheets—Sheet 1.

Witnesses
John W. Fleetwood, Inventor
By his Attorneys,

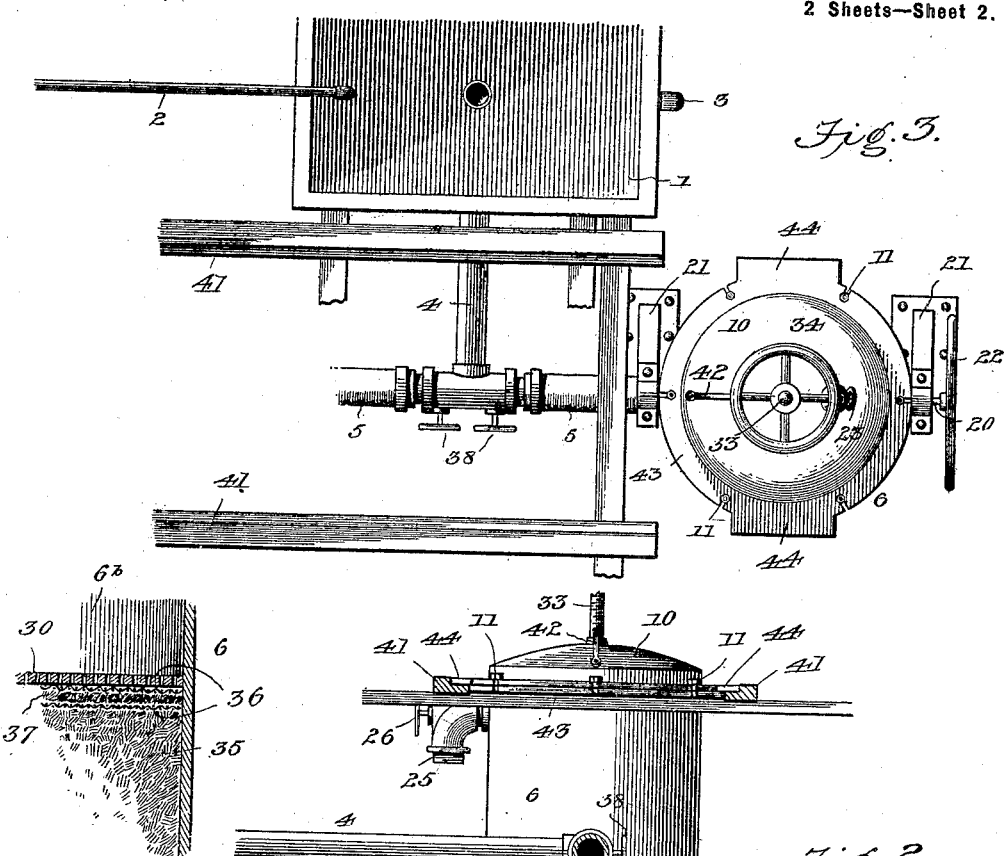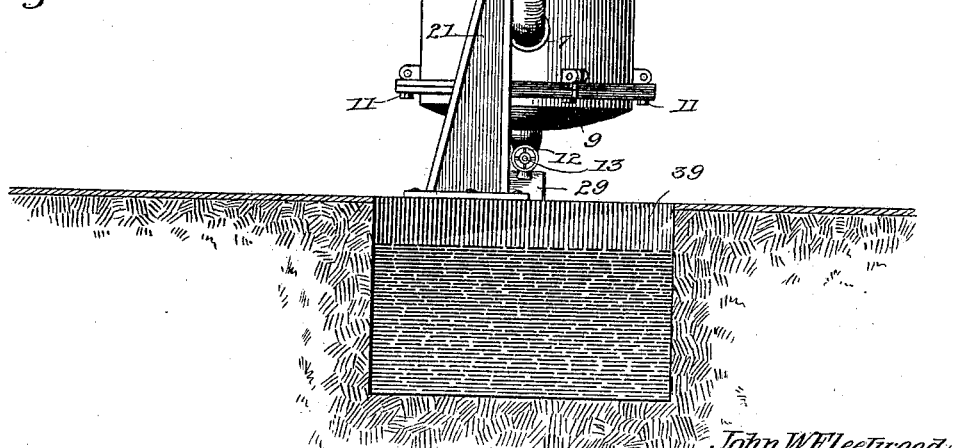

UNITED STATES PATENT OFFICE.

JOHN WESLEY FLEETWOOD, OF NEW ORLEANS, LOUISIANA, ASSIGNOR OF ONE-HALF TO WILLIAM ADLER, OF SAME PLACE.

FILTER.

SPECIFICATION forming part of Letters Patent No. 622,614, dated April 4, 1899.

Application filed March 25, 1898. Serial No. 675,105. (No model.)

*To all whom it may concern:*

Be it known that I, JOHN WESLEY FLEETWOOD, a citizen of the United States, residing at New Orleans, in the parish of Orleans and State of Louisiana, have invented a new and useful Filter, of which the following is a specification.

My invention relates to filters, and has for its object to provide a simple, compact, and efficient construction and arrangement of parts adapted for facilitating the operation of filtering liquids—such as cane-juice, syrup, water, oils, &c.—and, furthermore, to provide means for thoroughly cleansing the filtering medium and for discharging and replacing the same when necessary.

Further objects and advantages of this invention will appear in the following description, and the novel features thereof will be particularly pointed out in the appended claims.

In the drawings, Figure 1 is a view, partly in section, of a filtering apparatus constructed in accordance with my invention, a plurality of filtering tanks or cylinders being illustrated and one of the tanks being shown in an inverted position. Fig. 2 is a side view of a portion of the apparatus, the connections between the adjacent filtering-tanks being sectioned upon a plane indicated by the line 2 2 of Fig. 1. Fig. 3 is a partial plan view of the apparatus. Fig. 4 is a detail section of a portion of one of the filtering-tanks, showing the arrangement of the strata of filtering materials.

Similar numerals of reference indicate corresponding parts in all the figures of the drawings.

Communicating with the supply-tank 1, having an inflow-pipe 2 and an overflow-pipe 3, is a feed-pipe 4, which communicates by flexible valved branches or conveyers 5, respectively, with reversible filtering-tanks 6. Said conveyers, which preferably consist of flexible hose, are secured by clamps 7 to nipples 8, carried by the filtering-tanks 6 in communication with the receiving-compartments $6^a$ thereof, the interior of each filtering-tank being divided by an interposed filtering medium to form said receiving-chambers $6^a$ and discharge-chambers $6^b$. The outer ends of the inlet and discharge chambers are closed by heads 9 and 10, which are flanged to rest upon corresponding flanges on the cylindrical or body portions of the tanks and are secured thereto by bolts 11, which are preferably mounted upon the body portion of the cylinder to swing into and out of engagement with registering notches in said flanges. The head 9 carries a waste-outlet 12, having a controlling-valve 13 and designed to provide for the escape of cleansing-water from the tank after the flushing of the filtering medium, as hereinafter explained, and also in communication with the inlet-chamber of each tank is a water-supply conductor 14, connected to a hot-water tank 15 and provided with a controlling-valve 16, said conveyer also being preferably of flexible construction to allow movement of the tank without disconnection of the conveyer. Said hot-water or washing tank 15 is mounted upon suitable supports 17 and is fitted with a steam-coil 18 or its equivalent, whereby the contents of the tank may be kept at the desired temperature. The cleansing-tank is supplied by a suitable conductor 19.

Each filtering-tank is provided, approximately at its center, with lateral trunnions 20, mounted in suitable bearings on standards 21, whereby the tank is capable of tilting or swinging movement to accomplish its reversal, as indicated at the right in Fig. 1, such movement being accomplished without disarranging any of the connections of the tank with the other parts of the apparatus, as with the supply-pipe 4 and the conveyer 14, and in order that this reversal may be accomplished manually with facility one of the trunnions of each tank is provided with a hand-wheel 22. The head of the discharge-chamber $6^b$ is fitted with a drain-nozzle 23, having a controlling-valve 24, and also with a discharge nozzle or conductor 25, having a controlling-valve 26 or other equivalent means for closing the same when desired. The discharge or outlet nozzle 25 is located contiguous to the head of the discharge-chamber, and hence at a considerable interval from the dividing-partition formed by the filtering medium, whereby liquid as it is filtered rises through the filtering-tank to the level of the discharge or outlet opening before reaching a point of escape. Therefore the function of the drain-nozzle 23 is to allow that portion of the contents of the discharge-chamber which fills the latter from the level of the filtering medium to the plane of the outlet 25 to escape when the filtering-tank is inverted, the head 10, however, being in its proper relative position, as indicated in dotted lines at the right in Fig. 1. In this connection I also employ means whereby the tank may be normally held in its upright position, the same consisting of a locking-pin 27, having a securing-screw 28 and being adapted to fit in a socket formed in a stop-block 29, said parts being shown in their operative relation at the left in Fig. 1.

The construction of filtering medium which I prefer to employ in connection with the apparatus embodying my invention includes spaced fixed and movable walls or members 30 and 31, perforated to allow the passage of fluid from the receiving-chamber to the discharge-chamber of the filtering-tank. The fixed wall 31 is bolted or otherwise secured to an inwardly-extending flange or rim 32, and the movable wall is preferably connected with an adjusting or feed screw 33, which is threaded in a central opening in the head 10 of the tank and terminates in a hand-wheel 34 or its equivalent. Interposed between these walls is a stratum of amorphous finely-comminuted material 35, preferably of a compressible or yielding quality, such as cork cuttings; but I do not desire to be understood as limiting myself strictly to this material, as, in connection with the other elements of the filtering medium, I can successfully employ such materials as moss, sawdust, cotton-seed meal, cinders, or the equivalent thereof. As the openings in the perforated walls are not sufficiently fine to prevent small particles of filtering material from passing therethrough or becoming lodged therein, I preferably in practice arrange a secondary or auxiliary filtering medium upon each side of the main filtering material 35 and between the same and the inner surfaces of the perforated walls, the preferable construction of each of these auxiliary filtering materials embodying spaced webs 36, of reticulated or interstitial construction, between which is arranged a layer of fibrous material 37, as of moss, the fibrous material being held from displacement in the operations of the apparatus by the interstitial webs, which may consist of fine-mesh wire-gauze. After arranging the different strata of filtering materials in their proper relative positions the adjustable wall 30 would be moved toward the fixed wall 31 to compress the interposed material, and by varying the pressure which is applied by the adjustable wall the interstices between the particles of the granulated or main filtering material may be diminished in size to reduce the rapidity of percolation of the liquid therethrough.

The liquid to be filtered having first been introduced into the supply-tank 1 is fed through the supply-pipe 4 and its branches to the receiving-chambers of the filtering-tanks, the rapidity of flow being controlled by suitable valves 38, arranged, respectively, in said branches. Entering the receiving-chambers, which are normally arranged at the lower ends of the tanks or below the planes of the filtering mediums, the liquid passes upwardly through the filtering mediums to the receiving-chambers $6^b$ and thence flows outwardly through the discharge-conveyers 25 to a suitable filtered-liquid receptacle 39, from which the liquid may be withdrawn as required through a delivery or suction pipe 40 or its equivalent. When it is desired to cleanse the filtering medium, the valve 38 of the tank to be operated upon is closed to cut off the supply of liquid, and after releasing the tank by disengaging the stop or holding pin 27 from its socket the tank is inverted and the accumulation of liquid in the chamber $6^b$ is allowed to escape through the drain-nozzle 23, from whence it may pass by any suitable conductor (not shown) to the receptacle 39. Then operating the controlling-valve 16 cleansing liquid from the tank 15 may be introduced, after which by the manipulation of the hand-wheel 22 the tank may be rocked upon its trunnions to remove accumulations of sediment or foreign matter from the fibers and particles of the filtering materials, and as a means of facilitating this washing operation it is desirable to loosen the feed-screw 33, and thus relieve the filtering materials of pressure in order that the particles thereof may separate and allow a free admixture of the water therewith. A particular advantage in the use of cork waste or chips resides in the fact that being practically non-absorbent the filtration is accomplished superficially, the particles not becoming saturated therewith, and hence being cleansed with greater facility, and enabling the same filtering material to be used repeatedly without removal from the tank. After the tank has been agitated sufficiently to properly cleanse the filtering materials the discharge-nozzle 12 should be opened and the waste cleansing liquid conveyed to a suitable point of deposit, after which the movable wall of the filtering medium may be returned to its normal position and the operation of filtering resumed.

In order that the replacement of the granulated filtering material may be accomplished without loss of time, I have so constructed the parts that the head 10 may be entirely displaced from the tank, and for this purpose I employ a temporary head-support, consisting, in the construction illustrated, of parallel rails 41, arranged in the plane of the head when the tank is in its normal or upright position, whereby, after releasing the head, by disengaging the fastening-bolts thereof it may be slid laterally from the tank to a position upon the supporting-rails, as indicated in full lines at the right in Fig. 1, the head preferably having a handhold 42, whereby this movement may be accomplished. Obviously the movable wall 30 of the filtering medium must be adjusted to a point above the plane of the contiguous edge of the body portion of the tank before this lateral displacement of the head can be attained, and hence the head is constructed of such a depth as to receive said movable wall, as shown in Fig. 1, the depending rim 43 of the head constituting a seat in which the wall 30 is adapted to fit. Hence when it is desired to replace the filtering material the feed-screw 33 is operated to raise the wall 30 into its seat in the removable head above the plane of the contiguous edge of the cylinder, and after displacing the head, as hereinbefore described, the tank may be inverted to the position indicated at the right in Fig. 1 to discharge the cork cuttings or other material used in this connection.

The apparatus which I have illustrated in the drawings includes a plurality of tanks connected with branches of a common supply-pipe 4, and when so arranged a common supporting device consisting of the parallel rails 41 may be employed for both tanks, the head 10 of each tank being provided with diametrically opposite extensions or ears 44 to rest upon the rails; but it will be understood that a greater or less number of tanks may be used, as found desirable and necessary, and that various other changes in the form, proportion, and the minor details of construction may be resorted to without departing from the spirit or sacrificing any of the advantages of this invention.

Having described my invention, what I claim is—

1. A filtering apparatus having a reversible tank divided interiorly by a filtering medium to form receiving and discharge chambers with which communicate valved supply and outlet conveyers, one of the tank-heads being removable, and a temporary tank-head support, having rails arranged in the plane of the removable head when the tank is in its normal position, substantially as specified.

2. A filtering apparatus having a reversible tank divided interiorly by a filtering medium to form receiving and discharge chambers, with which communicate valved supply and outlet conveyers, one of the tank-heads being removable, and a temporary tank-head support, having rails arranged in the plane of the removable head when the tank is in its normal position, the tank-head being provided with diametrically opposite extensions or ears to traverse said rails, substantially as specified.

3. A filtering apparatus having a reversible filtering-tank provided at one end with a removable head, and having an interior filtering medium including an axially-movable perforated wall, a feed-screw connected with said movable wall and mounted in said removable head, the head being provided with a rim forming a seat of a depth adapted to receive said wall, and supply and outlet conveyers communicating with the chambers at opposite sides of the filtering medium, substantially as specified.

4. A filtering apparatus having a reversible filtering-tank, fulcrumed at an intermediate point and provided with an inlet-port located eccentrically with relation to the fulcrum, a stationary supply-pipe, and a flexible conveyer, permanently connecting the supply-pipe with said port.

5. A filtering apparatus, having a reversible filtering-tank, fulcrumed at an intermediate point, and provided with an inlet-port located eccentrically with relation to the fulcrum, a supply-pipe having a stationary arm arranged in alinement with the axis of the tank, and a flexible conveyer connecting said arm of the supply-pipe, with said port.

6. A filtering apparatus having a reversible filtering-tank, interiorly adapted to form inlet and discharge chambers, supply and outlet conveyers in connection, respectively, with said chambers, valved waste and drain nozzles 12 and 23 respectively in connection with said chambers, a flexible valved conductor in permanent communication with the inlet-chamber for conveying cleaning liquid thereto.

7. A filtering apparatus having a reversible tank provided with a filtering medium, whereby its interior is divided to form inlet and discharge chambers with which communicate supply and outlet conveyers, a valved conductor in communication with one of the chambers for supplying a cleansing liquid, and holding devices, including an adjustable stop-pin, carried by the tank, and a stationary socket for engagement by said pin, substantially as specified.

8. A filtering apparatus having a plurality of coaxially-mounted reversible tanks, provided with interior filtering mediums to form inlet and discharge chambers, with the latter of which communicate outlet-conveyers, a common supply-conveyer flexibly connected with the inlet-chambers of the tanks, the tanks being provided with removable heads, and a common head-support extending between and arranged in a common plane with the removable heads of the tanks when the parts are in their normal positions, substantially as specified.

9. A filtering-tank having a filtering medium consisting of spaced fixed and movable perforated walls, an interposed stratum of granulated filtering material, and auxiliary strata of filtering material interposed between said walls and the granulated stratum, and each consisting of spaced interstitial webs and an interposed layer of fibrous material, substantially as specified.

In testimony that I claim the foregoing as my own I have hereto affixed my signature in the presence of two witnesses.

JOHN WESLEY FLEETWOOD.

Witnesses:
PHILIP REAMES,
WM. H. WRIGHT.